(12) United States Patent
Almog

(10) Patent No.: US 9,713,770 B2
(45) Date of Patent: *Jul. 25, 2017

(54) METHOD AND SYSTEM FOR A-SYNCHRONOUS MULTI-PLAYER NETWORK-BASED GAMING

(71) Applicant: Playtika Ltd., Las Vegas, NV (US)

(72) Inventor: Gilad Almog, Rosh Haayin (IL)

(73) Assignee: Playtika Ltd., Herzliya Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/059,889

(22) Filed: Mar. 3, 2016

(65) Prior Publication Data
US 2016/0214009 A1 Jul. 28, 2016

Related U.S. Application Data

(63) Continuation of application No. 13/880,216, filed as application No. PCT/IB2011/054575 on Oct. 16, 2011, now Pat. No. 9,295,914.
(Continued)

(51) Int. Cl.
G06F 17/00 (2006.01)
A63F 13/352 (2014.01)
(Continued)

(52) U.S. Cl.
CPC ............ *A63F 13/352* (2014.09); *A63F 13/12* (2013.01); *A63F 13/30* (2014.09); *A63F 13/335* (2014.09);
(Continued)

(58) Field of Classification Search
USPC .................................................. 463/40–42
See application file for complete search history.

(56) References Cited

U.S. PATENT DOCUMENTS 5,779,549 A 7/1998 Walker et al.
6,117,013 A 9/2000 Eiba
(Continued)

FOREIGN PATENT DOCUMENTS

GB 2359640 A 8/2001
GB 2373138 A 9/2002
(Continued)

OTHER PUBLICATIONS

"E-Mail Internet Poker Server Manual (WRGPT Server)," Dec. 10, 2010, seventeen pages. [Online] [Retrieved May 6, 2016] Retrieved from the Internet: <URL:http://wrgpt.org/>.

*Primary Examiner* — Ronald Laneau
(74) *Attorney, Agent, or Firm* — Fish & Richardson P.C.

(57) ABSTRACT

A system for a-synchronous multi-player network-based and turn-based gaming, the system comprising: a client associated with a processing unit and being configured to communicate over a network with a gaming server and receive a tournament invitation and at least one game move notification therefrom; the client is further configured to receive participation authorization indication from a player and instruct the processing unit to perform at least the following: send the participation authorization to the gaming server; receive at least one game move instruction from a player within a time interval parameter defining a time-window during which said player has to make a game move in his turn; and send the game move instruction to the gaming server if the time interval is met.

20 Claims, 9 Drawing Sheets

Related U.S. Application Data

(60) Provisional application No. 61/405,012, filed on Oct. 20, 2010.

(51) Int. Cl.
*A63F 13/795* (2014.01)
*A63F 13/335* (2014.01)
*A63F 13/48* (2014.01)
*A63F 13/30* (2014.01)

(52) U.S. Cl.
CPC ............ *A63F 13/48* (2014.09); *A63F 13/795* (2014.09); *A63F 2300/556* (2013.01); *A63F 2300/558* (2013.01); *A63F 2300/5566* (2013.01); *A63F 2300/5593* (2013.01)

(56) References Cited

U.S. PATENT DOCUMENTS

| | | |
|---|---|---|
| 6,524,189 B1 | 2/2003 | Rautila |
| 7,666,084 B2 | 2/2010 | Herrmann et al. |
| 8,157,647 B2 | 4/2012 | House et al. |
| 8,388,450 B1 * | 3/2013 | McGuirk .................. A63F 9/24 463/42 |
| 8,727,892 B1 | 5/2014 | Chun |
| 8,779,549 B2 | 7/2014 | Kim et al. |
| 2002/0061778 A1 | 5/2002 | Acres |
| 2006/0154710 A1 | 7/2006 | Serafat |
| 2007/0129123 A1 | 6/2007 | Eryou et al. |
| 2007/0173324 A1 | 7/2007 | Multerer et al. |
| 2008/0020848 A1 | 1/2008 | Muir et al. |
| 2009/0280892 A1 | 11/2009 | Lutnick et al. |
| 2010/0106612 A1 | 4/2010 | Gupta et al. |
| 2013/0344963 A1 * | 12/2013 | Gupta ..................... A63F 13/12 463/40 |
| 2015/0088289 A1 * | 3/2015 | Robbins .................. G07F 17/32 700/91 |

FOREIGN PATENT DOCUMENTS

| | | |
|---|---|---|
| GB | 2385489 A | 8/2003 |
| KR | 20030008773 A | 1/2003 |
| WO | WO 2008/123794 A1 | 10/2008 |

* cited by examiner

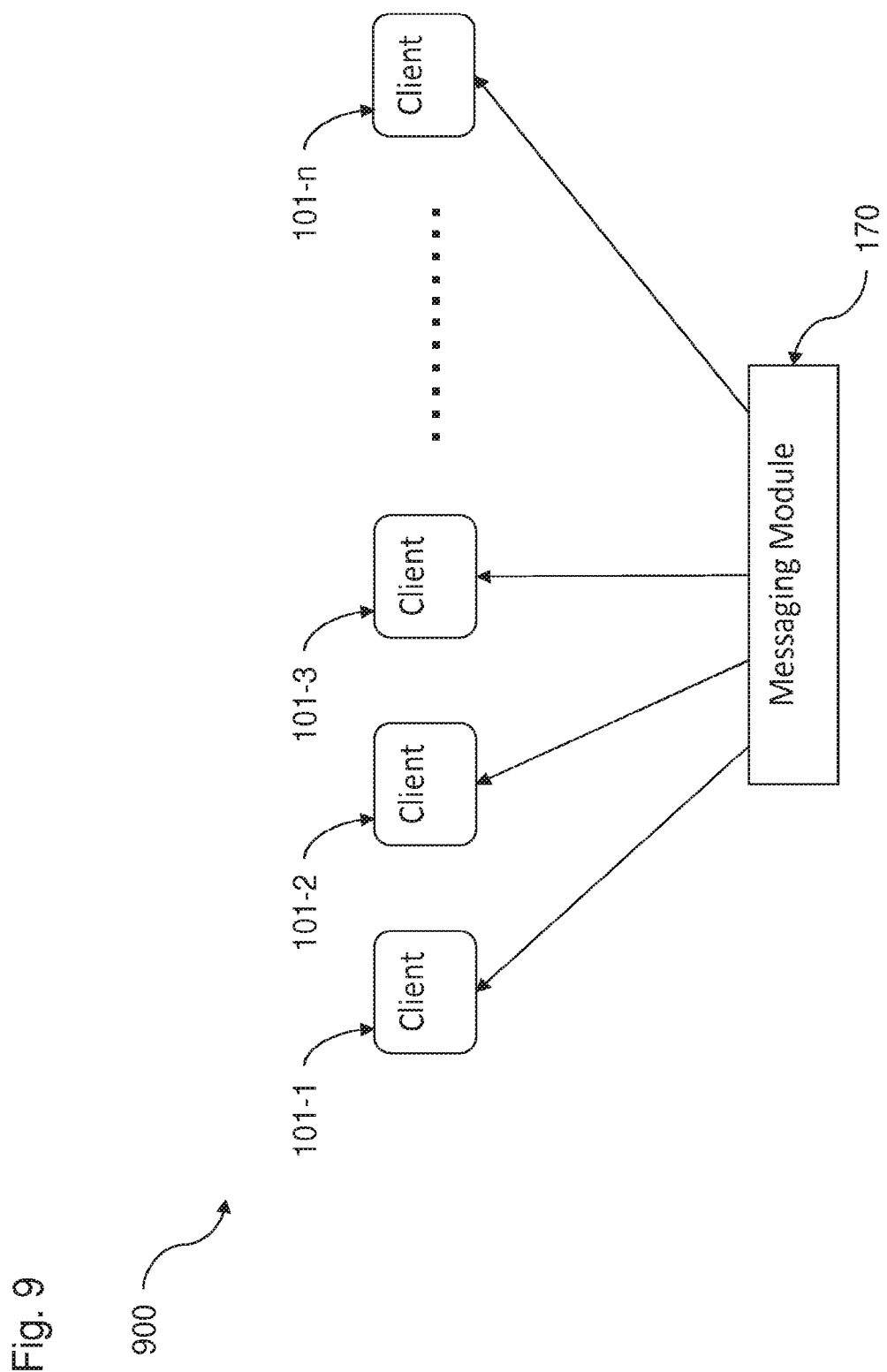

METHOD AND SYSTEM FOR A-SYNCHRONOUS MULTI-PLAYER NETWORK-BASED GAMING

CROSS REFERENCE TO RELATED APPLICATIONS

This application is a continuation of U.S. application Ser. No. 13/880,216, 371(c) date Jan. 17, 2014, which is a National Stage of International Application No. PCT/IB11/54575, filed Oct. 16, 2011 which claims the benefit of U.S. Provisional Application No. 61/405,012, filed Oct. 20, 2010, the contents of all of which are incorporated herein in their entireties by reference.

FIELD OF THE PRESENTLY DISCLOSED SUBJECT MATTER

This invention relates to the field of network-based gaming, and more specifically to the field of a-synchronous multi-player network-based gaming.

BACKGROUND

Internet gaming enables a person (hereinafter: "user") having access to a computer, a cellular phone or other computerized device with Internet (or other network) access, to log-in to the Internet and access a plurality of on-line games. Some of the games can be multi-player games in which a user can play with other users from all around the world.

One type of such Internet gaming is a-synchronous multi-player network-based gaming, in which a user does not have to be connected to the Internet throughout the game. In such type of gaming, each user has a certain time-frame to perform a game move once his turn comes.

However, a-synchronous multi-player network-based gaming platforms nowadays have many limitations. For example, a user is unable to choose the players with whom he is interested in playing, nor can he control any other game parameter. In addition, when more than two users participate in a tournament, a user losing a single game of the tournament has to wait until the game round is finished in order to enter the next game round, as the games are not managed dynamically. Still further, in some cases a message is sent to a user when a game move has been made. Such messages are usually sent to one pre-defined platform, such as an e-mail account, and there is no multi-platform support enabling sending messages to multiple platforms such as cellular phones, e-mail accounts, social network accounts, etc.

SUMMARY

In accordance with an aspect of the presently disclosed subject matter, there is provided a system for a-synchronous multi-player network-based gaming, the system comprising a gaming server associated with a processing unit and being configured to communicate over a network with at least one client associated with a tournament creator and receive tournament parameters, including at least a list of selected players wherein the list is generated by the tournament creator; the gaming server is further configured to instruct the processing unit to perform at least the following: send tournament invitations to the selected players, receive participation authorization from at least one of the selected players; start a tournament.

In accordance with an embodiment of the presently disclosed subject matter, there is further provided a system wherein the gaming server further includes a game logic module comprising at least one set of game rules, each defining a game logic, and wherein the gaming server is further configured to instruct the processing unit to manage the tournament according to one of the game logics.

In accordance with an embodiment of the presently disclosed subject matter, there is yet further provided a system wherein the gaming server is further configured to instruct the processing unit to dynamically allocate players to game tables.

In accordance with an embodiment of the presently disclosed subject matter, there is further provided a system wherein the tournament parameters further include a minimum number of players for a single game parameter and wherein the gaming server is further configured to instruct the processing unit to utilize indications of players that are not part of a game and to generate a game table when the minimum number of players for a single game is equal to or larger than the minimum number of players for a single game parameter.

In accordance with an embodiment of the presently disclosed subject matter, there is further provided a system wherein the tournament parameters further include a minimum number of players in the tournament and wherein the gaming server is configured to instruct the processing unit to start the tournament only if at least the minimum number of players accepted the tournament invitation.

In accordance with an embodiment of the presently disclosed subject matter, there is further provided a system wherein the tournament parameters further include a time interval parameter defining a time during which a player has to make a game move when his turn comes and wherein the gaming server is configured to further instruct the processing unit to check compliance to the time interval and take action in case of non-compliance.

In accordance with an embodiment of the presently disclosed subject matter, there is further provided a system wherein the tournament parameters further include a time window in which the tournament is not active and wherein the gaming server is configured to further instruct the processing unit to disregard the time window when checking compliance to the time interval.

In accordance with an embodiment of the presently disclosed subject matter, there is further provided a system wherein only players invited to the tournament can join the tournament.

In accordance with an embodiment of the presently disclosed subject matter, there is further provided a system wherein players that were not invited to the tournament can join the tournament.

In accordance with an embodiment of the presently disclosed subject matter, there is further provided a system wherein the gaming server is further configured to instruct the processing unit to generate the tournament invitations in a format associated with the tournament invitations destination.

In accordance with an embodiment of the presently disclosed subject matter, there is further provided a system wherein the list of selected players is generated by the tournament creator by utilizing the tournament creator list of friends from a social network or a combination of such list of friends from a social network and a list of friends generated by the tournament creator.

In accordance with an embodiment of the presently disclosed subject matter, there is further provided a system wherein utilizing the tournament creator list of friends from a social network further includes instructing the processing unit to connect to the social network, retrieve the list of friends from the social network, store the list of friends on a data repository and display at least the list of friends on the at least one client.

In accordance with an embodiment of the presently disclosed subject matter, there is further provided a system wherein the gaming server is further configured to receive a filtering criterion and instruct the processing unit to filter, according to the filtering criterion, at least one of the list of friends from a social network and list of friends generated by the tournament creator.

In accordance with an embodiment of the presently disclosed subject matter, there is further provided a system wherein the filtering criterion is at least one of the following:
(a) minimum player score;
(b) maximum player score;
(c) minimum number of tournaments participated by the player;
(d) maximum number of tournaments participated by the player;

In accordance with an aspect of the presently disclosed subject matter, there is further provided a method for a-synchronous multi-player network-based gaming, the method comprising instructing a processing unit to perform the following:
(a) receiving tournament parameters including at least a list selected players generated by a tournament creator;
(b) sending tournament invitations to the selected players;
(c) receiving participation authorization from at least one of the selected players; and
(d) starting a tournament.

In accordance with an embodiment of the presently disclosed subject matter, there is further provided a method further comprising instructing the processing unit to manage the tournament according to a game logic wherein the game logic is one of at least one set of game rules, each defining a game logic.

In accordance with an embodiment of the presently disclosed subject matter, there is further provided a method further comprising instructing the processing unit to dynamically allocate players to game tables.

In accordance with an embodiment of the presently disclosed subject matter, there is further provided a method wherein the tournament parameters further include a minimum number of players for a single game parameter and further comprising instructing the processing unit to utilize indications of players that are not part of a game and to generate a game table when the minimum number of players for a single game is equal to or larger than the minimum number of players for a single game parameter.

In accordance with an embodiment of the presently disclosed subject matter, there is further provided a method wherein the tournament parameters further include a minimum number of players in the tournament and further comprising instructing the processing unit to start the tournament only if at least the minimum number of players accepted the tournament invitation.

In accordance with an embodiment of the presently disclosed subject matter, there is further provided a method wherein the tournament parameters further include a time interval parameter defining a time during which a player has to make a game move when his turn comes and further comprising instructing the processing unit to check compliance to the time interval and take action in case of non-compliance.

In accordance with an embodiment of the presently disclosed subject matter, there is further provided a method wherein the tournament parameters further include a time window in which the tournament is not active and further comprising instructing the processing unit to disregard the time window when checking compliance to the time interval.

In accordance with an embodiment of the presently disclosed subject matter, there is further provided a method wherein only players invited to the tournament can join the tournament.

In accordance with an embodiment of the presently disclosed subject matter, there is further provided a method wherein players that were not invited to the tournament can join the tournament.

In accordance with an embodiment of the presently disclosed subject matter, there is further provided a method further comprising instructing the processing unit to generate the tournament invitations in a format associated with the tournament invitations destination.

In accordance with an embodiment of the presently disclosed subject matter, there is further provided a method wherein the list of selected players is generated by the tournament creator by utilizing the tournament creator list of friends from a social network or a combination of such list of friends from a social network and a list of friends generated by the tournament creator.

In accordance with an embodiment of the presently disclosed subject matter, there is further provided a method wherein utilizing the tournament creator list of friends from a social network further includes instructing the processing unit to connect to the social network, retrieve the list of friends from the social network, store the list of friends on a data repository and display at least the list of friends on the at least one client.

In accordance with an embodiment of the presently disclosed subject matter, there is further provided a method further comprising receiving a filtering criterion and instructing the processing unit to filter, according to the filtering criterion, at least one of the list of friends from a social network and list of friends generated by the tournament creator.

In accordance with an embodiment of the presently disclosed subject matter, there is further provided a wherein the filtering criterion is at least one of the following: minimum player score; maximum player score; minimum number of tournaments participated by the player; maximum number of tournaments participated by the player.

In accordance with an aspect of the presently disclosed subject matter, there is further provided a system for a-synchronous multi-player network-based gaming, the system comprising:
a client associated with a processing unit and being configured to communicate over a network with a gaming server and receive a tournament invitation and at least one game move notification therefrom;
the client is further configured to receive participation authorization indication from a player and instruct the processing unit to perform at least the following:
send the participation authorization to the gaming server;
receive at least one game move instruction; and send the game move instruction to the gaming server.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 9 is a block diagram schematically illustrating one example of simultaneous notification distribution to multiple platforms, in accordance with the presently disclosed subject matter.

DETAILED DESCRIPTION

Figure 1:
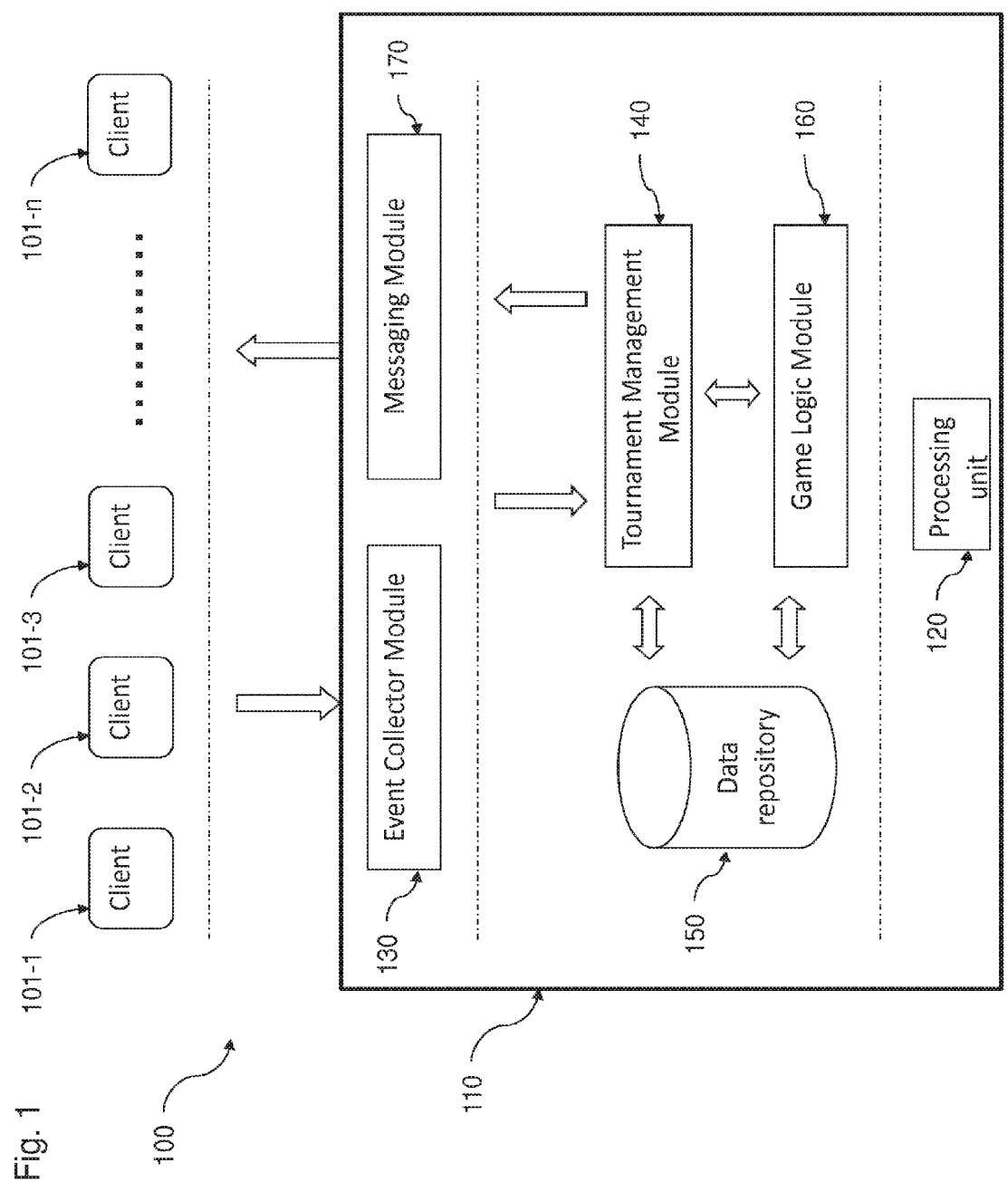
FIG. 1 is a block diagram schematically illustrating one example of a system for a-synchronous multi-player gaming, in accordance with the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "instructing", "receiving", "starting", "sending", "utilizing" or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate an-ay (FPGA), an application specific integrated circuit (ASIC), etc.), any other electronic computing device, and or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in 30 connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter, fewer, more and/or different stages than those shown in FIGS. 2, 3, 4, 5, 6, 7, 8 and 9 may be executed. In embodiments of the presently disclosed subject matter one or more stages illustrated in FIGS. 2, 3, 4, 5 and 6 may be executed in a different order and/or one or more groups of stages may be executed simultaneously. FIGS. 1 and 9 illustrate a general schematic of the system architecture in accordance with an embodiment of the presently disclosed subject matter. Each module in FIGS. 1 and 9 can be made up of any combination of software, hardware and/or firmware that performs the functions as defined and explained herein. The modules in FIGS. 1 and 9 may be centralized in one location or dispersed over more than one location. In other embodiments of the presently disclosed subject matter, the system may comprise fewer, more, and/or different modules than those shown in FIGS. 1 and 9.

Bearing this in mind, attention is drawn to FIG. 1, illustrating one example of a system for a-synchronous multi-player gaming, in accordance with the presently disclosed subject matter. As further detailed below, System 100 can be configured to create and manage one or more tournaments having two or more participants (hereinafter: "Players") (each tournament can have, for example, 2, 3, 4, 5, 6 . . . etc. players). A tournament is a set of one or more games, wherein each game involves a subset of at least two of the tournament players (the subset can comprise, for example 2, 3, 4, 5, 6, etc. players). Each tournament is further associated with a set of predetermined game rules, each defining a certain game logic, as further elaborated below. System 100 can be configured to keep a score for the players based on their performances in the games. Such a score can be based, for example, on virtual points according to the pre-determined game rules. In some cases the score can be monetary as, for example, each score is worth a pre-determined sum of money.

System 100 comprises at least two clients (illustrated as 101-1, 101-2, 101-3, to 101-*n*) configured to communicate with a gaming server 110. Clients (101-1 to 101-*n*) can be, but are not limited to, a personal or portable computer, a server computer, a PDA, a cellular phone or any other apparatus having the appropriate processing infrastructure (software and hardware) for running an appropriate process (e.g. client process) and communicating over a communication network with gaming server 110. Clients (101-1 to 101-*n*) can include a display (e.g. LCD screen), and an input device such as a keyboard, a touch screen or any other suitable input device. Gaming server 110 can be, but is not limited to, at least one personal or portable computer comprising at least one processing unit 120 which is configured to manage, control and execute relevant gaming server 110 components and operations.

Clients (101-1 to 101-n) can be configured to receive input parameters from players associated therewith. The input parameters can include, inter alia, log-in parameters enabling identification of a player (e.g. user name and password, biometric identification data, etc.) or log-out parameters. It is to be noted that more than one player can be associated with each of clients (101-1 to 101-n). For example, a first player can log-in to system 100 via a specific client (e.g. a portable computer), and then log-out of system 100. Following the first player log-out of system 100 a second player can log-in to system 100 via the same client using his own log-in parameters. In addition, it is to be noted that a specific player can also be associated with more than one of clients (101-1 to 101-n). For example, a user can log-in to the system via a first client (e.g. a personal computer) and via a second client (e.g. a cellular phone). In some cases, system 100 can be configured to enable a player to be logged-in through a plurality of clients (101-1 to 101-n) simultaneously (e.g. a personal computer and a cellular phone).

Clients can be further configured to communicate all or part of the received input parameters to gaming server 110. The input parameters can also include, for example, parameters for creating a new tournament. Such parameters for creating a new tournament can include, for example, the tournament start date, a time interval for a player to make a game move (in some cases, if a player does not make a move within this pre-determined time interval he, for example, loses his turn, or loses the game or loses points or money), a minimum number of players in a tournament, etc. The input parameters can also include parameters associated with a game move a player is interested in performing (for example, in Monopoly®, buying a property, etc.). Gaming server 110 can comprise event collector module 130 for receiving the input parameters from clients (101-1 to 101-n) and directing them to the appropriate module for handling. Gaming server 110 can further comprise tournament management module 140. In some cases all input parameters are directed to tournament management module 140, which then handles them as further detailed below. In some cases, tournament management module 140 directs all or part of the input parameters to other modules for handling.

Tournament management module 140 can be further configured to receive from event collector module 130 input parameters for creating a new tournament and create a new tournament accordingly. Tournament management module 140 can be further configured to store the received input parameters in data repository 150 associated with gaming server 110. Data repository 150 can be for example non-volatile or volatile memory, including, but not limited to, RAM, ROM, flash memory, etc. Tournament management module 140 can be also configured to start a tournament if the conditions to start the tournament are met, as further described below.

Gaming server 110 can also comprise game logic module 160. Game logic module 160 can be configured to receive, for example from tournament management module 140 or event collector module 130, input parameters associated with a game move a player is interested in performing and validate the requested move. In case the requested move is valid, game logic module 160 can be configured to instruct tournament management module 140 to perform the requested move and update data repository 150 accordingly. Game logic module 160 is further configured to check if performance of the move results in triggering an event according to the pre-defined game rules. Such an event can be, inter alia, a certain player winning or losing a game. In certain games, according to certain game logics, such an event can be, inter alia, paying a "fine" such as in the game of Monopoly®. In case an event is triggered by the requested move, game logic module 160 can be configured to instruct tournament management module 140 to perform the event and update data repository 150 accordingly.

Gaming server 110 can further comprise a messaging module 170. Messaging module 170 can be configured to receive a notification from tournament management module 140 and create a personalized notification directed to the relevant player or players. Such notifications may be for example notification about tournament start, notification about tournament end, notification about a move performed by one of the players, notification about an illegal move performed by a player, etc. Messaging module 170 can be configured to generate the notifications to the relevant player or players in compatibility to one or more types of clients (101-1 to 101-n), e.g. a personal computer (for example via a dedicated website), a cellular phone (for example via a text message), etc.

Figure 2:
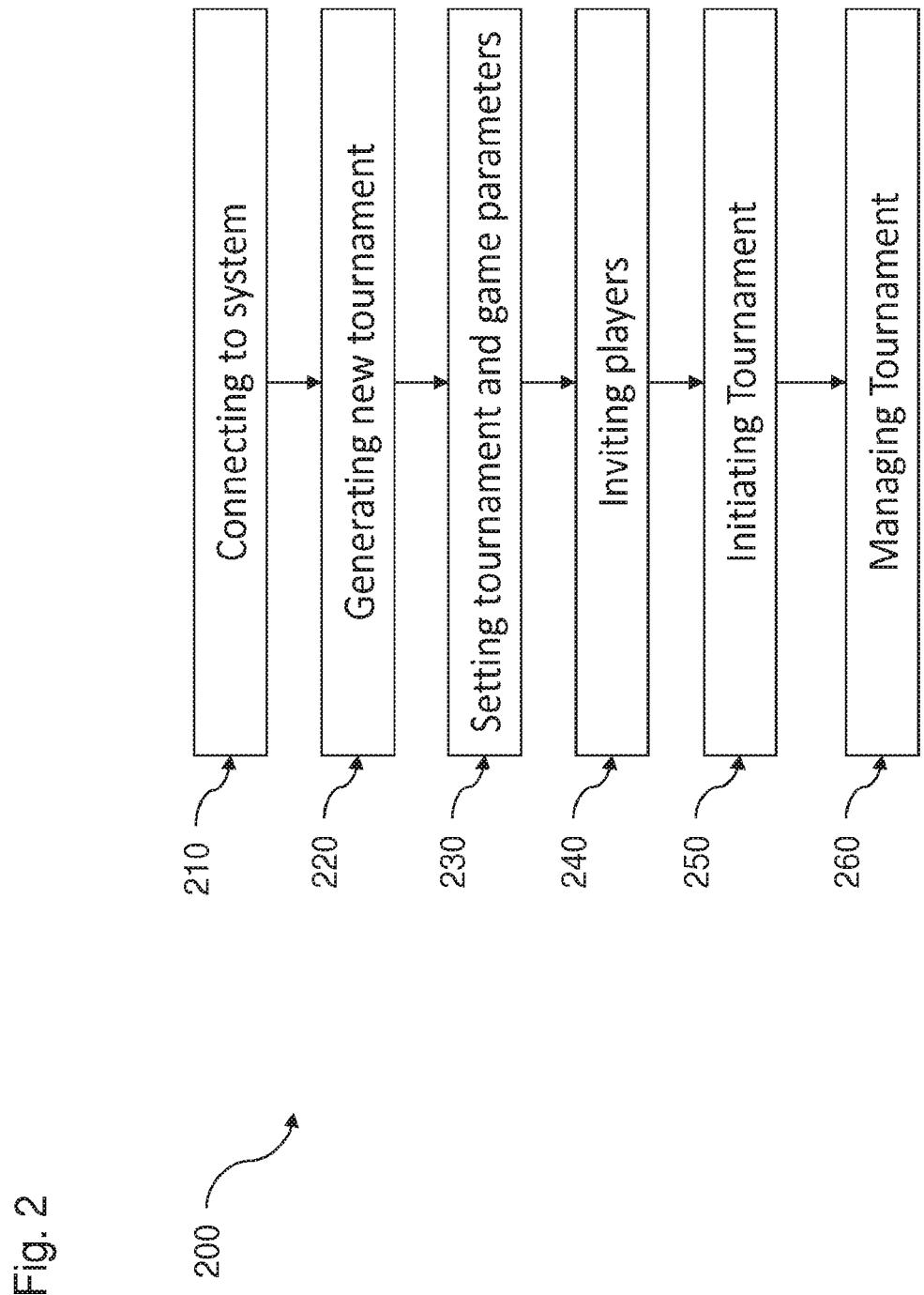
FIG. 2 is a flowchart illustrating one example of a sequence of operations carried out for creating an a-synchronous multi-player tournament, in accordance with the presently disclosed subject matter.

FIG. 2 is a flowchart illustrating one example of a sequence of operations carried out for creating an a-synchronous multi-player tournament, in accordance with the presently disclosed subject matter. Process 200 begins when a player interested in creating a tournament (hereinafter "tournament creator") connects to system 100 (step 210). In case the tournament creator is not registered to system 100, system 100 can be configured to request the tournament creator to perform an initial registration step in which he will be required to provide, inter alia, details for his identification (e.g. user name and password, biometric identification data, etc.). Such identification details will be saved in data repository 150.

Figure 7:
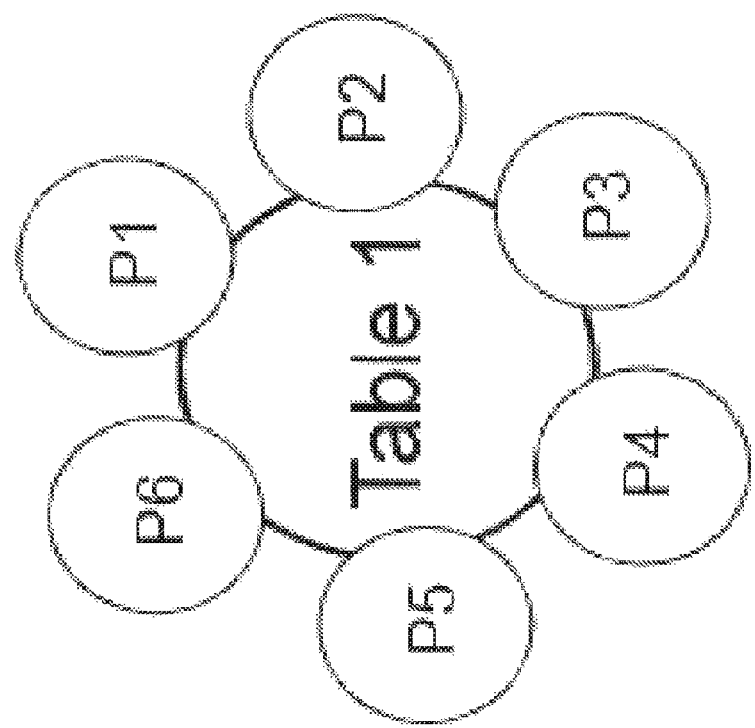
FIG. 7 is an illustration of one example of a game table, in accordance with the presently disclosed subject matter.

After connecting or registering to system 100 the tournament creator can generate a new tournament (step 220). Following generation of a new tournament the tournament creator can set the tournament and game parameters (step 230). At this stage, the tournament creator can set, inter alia, and by way of example:

a. A name for the tournament, to be later used in order to identify the tournament from other tournaments taking place in the system.

b. A minimum player score for entering the tournament. In this regard it is to be noted that player scores can be maintained by system 100 and saved in data repository 150. In such a manner, each registered player is associated with a score that is updated according to the game rules and his performance in the tournament games. Thus, a tournament creator can decide that registration to the created tournament will be limited to players with a minimum or maximum score for example.

c. The type of game to be played in the tournament, e.g. Monopoly®, Checkers, Tic-tac-toe, Poker, etc.

d. A minimum number of players in the tournament, a minimum number of players in a game. In Monopoly®, for example, the tournament creator can decide that at least 4 players must play in each game. It is to be noted however that in some cases there can be an exception to the rule, for example, when there are not enough players to meet this restriction. In such cases, a smaller number of players in a table can be allowed.

e. A maximum number of players in a game. In Checkers, for example, the maximum number of players in a game is two players. In other game types however, the number of players in a game can be higher than 2, and in some cases there is no restriction on a maximum number of players arising from the game rules. In such cases, the tournament creator can decide on a maximum number of players in a single game.

f. A minimum number of players in a game. In Checkers, for example, the minimum number of players in a game is two players. In some cases the tournament creator can decide that the minimum number of players in a game is higher than two (in cases where the game rules enable it).

g. A time interval parameter for a player to make a game move. In asynchronous multi-player gaming this is an important parameter, defining the time given to a player to perform a game move as his turn comes. Looking at FIG. 7, illustrating an one example of game table, in accordance with the presently disclosed subject matter, one may assume that the game has just started and a certain game began between P1 (player 1), P2 (player 2), P3 (player 3), P4 (player 4), P5 (player 5), P6 (player 6), and further assume that P1 has the first turn, and P2 has the second turn (as, for example, the system 100 randomly selected the turns or that the turns are calculated according to a score associated with each of the players and saved in data repository 150). According to the time interval, P1 has a limited time to perform his move. The time interval can be, for example, 5 hours, after which, if the player did not perform any legal move, system 100 can be configured to perform an action. Such action can be, for example, but not limited to:

i. Passing the turn to the next player;
ii. Taking the player out of the game;
iii. Reducing player score;
iv. Making a pre-determined or random move instead of the player.

h. A time window in which the tournament is not active. As detailed above, each player has a time interval to make a game move as his turn comes. In some cases, it may be desired to exclude certain time frames from such restriction. For example, night hours (for example 10 pm to 10 am) may be excluded, such that during these hours the time interval for a player to make his game move is not counted. Thus, if a player's turn comes at 9:45 pm and the time interval for a player to make a game move is set to 2 hours, the time interval will end at 11:45 am and not at 11:45 pm. In addition, certain days or dates can be also excluded such that on certain days or dates the time interval for a player to make his game move is not counted. For example, weekends (Friday to Sunday) may be excluded, etc.

i. A parameter indicating if the tournament is a public or a private tournament. A public tournament is a tournament in which every player who is registered to system 100 can join by selecting to do so from a list of available public tournaments (for example, tournaments that the tournament creator set as public and that the maximum players in a tournament has not been met yet). A private tournament is a tournament to which the tournament creator can invite players (registered or not registered, as further detailed with respect to step 240) whereas only those invitees can join the tournament at their will (as further described with reference to FIG. 3).

Following setting of the tournament and game parameters (it is to be emphasized that the above list contains examples of tournament and game parameters and other tournament and game parameters can be also exist) by the tournament creator, the tournament creator can invite players to the created tournament (step 240). Regardless 25 of the tournament being, for example, private or public, as detailed above, the tournament creator can provide information on other players, whether registered to the system or not, to be invited to the tournament. System 100 can be configured, for example, to enable the tournament creator to insert a list of e-mail addresses and/or, phone numbers, etc., of players the tournament creator is interested in inviting to the tournament. Alternatively or additionally, system 100 can be configured to import and display to the tournament creator a list of friends of the tournament creator from, for example, a social network (e.g. Facebook, AOL, Yahoo!, etc.) by utilizing a publically available standard API for that purpose.

Figure 8:
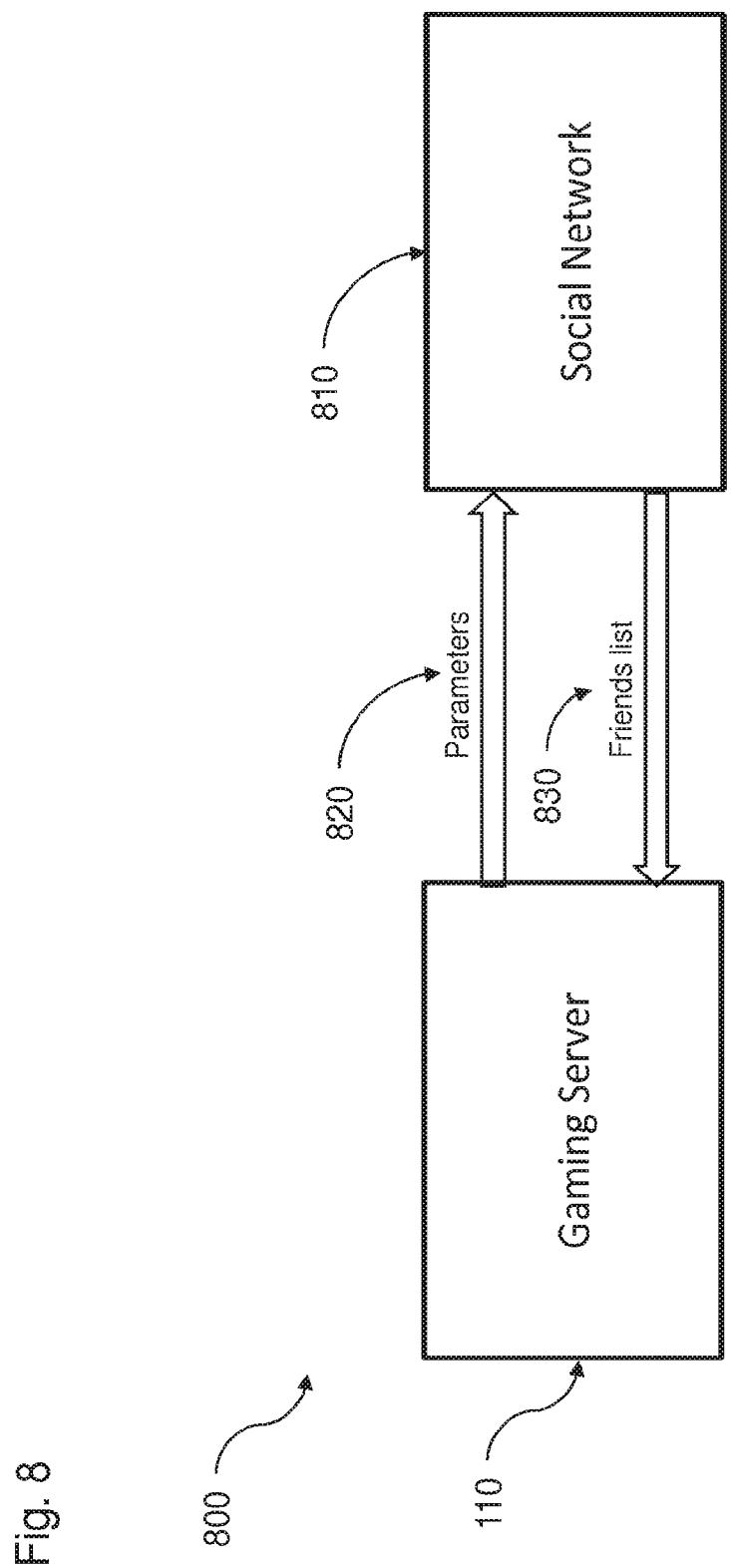
FIG. 8 is an illustration of one example of an interaction between a gaming server and a social network for retrieving a list of friends from the social network, in accordance with the presently disclosed subject matter.

Looking at FIG. 8, illustrating one example of an interaction between a gaming server and a social network for retrieving a list of friends from the social network, in accordance with the presently disclosed subject matter, gaming server 110 can be configured to provide the social network with parameters 820. The parameters can 5 include, inter alia, social network user identification parameters such as username and password, and parameters defining the requested information (for example an indication that the requested data from social network 810 is the entire friends list of the user or a certain part of the friends list, etc.). Social network 810 is configured to authenticate the identification parameters. If the user is authenticated, social network is configured to provide gaming server with the requested friends list 830.

Returning to FIG. 1, the tournament creator can select friends to be invited to the tournament from the friends list received from the social network (in addition to inserting a list of e-mail addresses and/or phone numbers, etc. as described above).

In some cases, system 100 can be configured to manage a list of players that the tournament creator has previously selected as tournament friends. For this purpose, system 100 can enable a player to add friends to the list. Such friend lists can, in some cases, comprise only registered players. In some cases, system 100 can be configured to enable the tournament creator to filter the users according to certain criteria. For example, system 100 can enable the tournament creator to filter the friends list according to their current score in the system. For this purpose, system 100 can be configured, for example, to check for each friend in the friends list, if it is registered to system 100, and if so, retrieve the friend's score from data repository 150. Thus, if the tournament creator is interested, for example, in creating a tournament for players that have a score higher than a certain threshold, system 100 can filter out from the friends list friends that are not registered to system 100 and friends having a score higher that the threshold set by the tournament creator. Other filter criteria can be available, inter alia, according to the data saved in the data repository 150.

Figure 6:
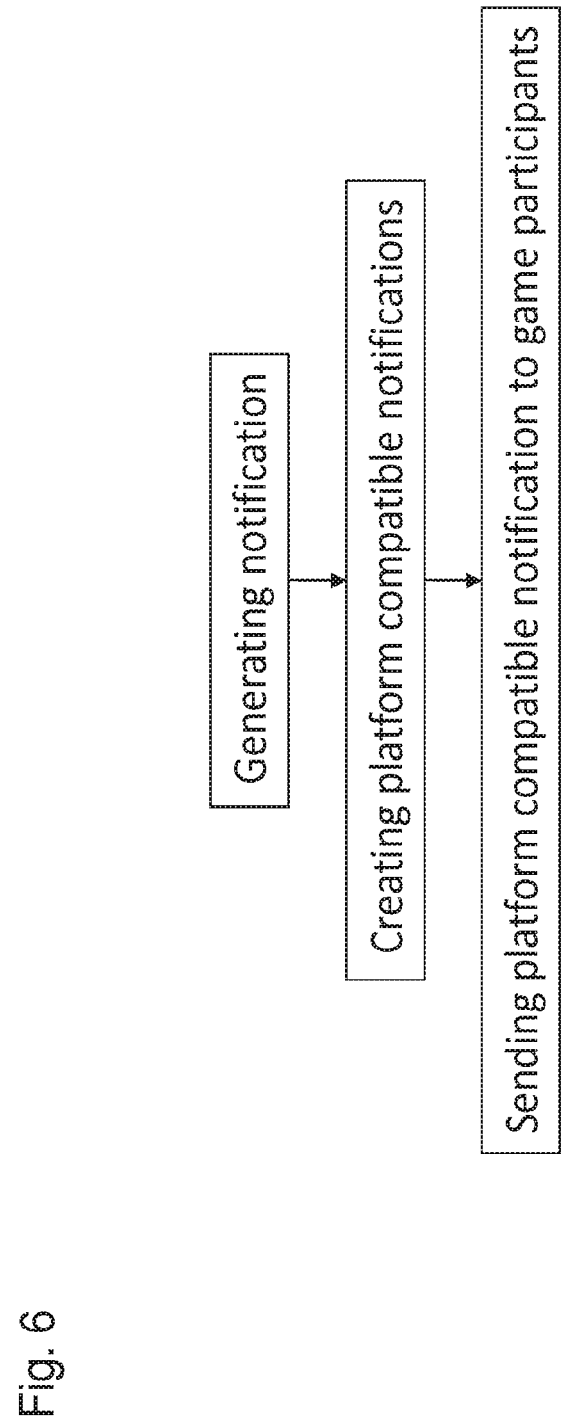
FIG. 6 is a flowchart illustrating one example of a sequence of operations carried out for sending notifications to invitees or participants of an a-synchronous multi-player tournament, in accordance with the presently disclosed subject matter.

Following selection of players to be invited to the tournament by the tournament creator, system 100 can be configured to send invitation notifications to the selected players, selected by the tournament creator to be invited to the tournament. The invitation notifications can be sent to a plurality of clients (101-1 to 101-n) utilizing a plurality of messaging methods, including, but not limited to, e-mail messages, text messages to cellular phones, messages to social network accounts (utilizing, for example, publically available API's to interact with the social networks), etc. System 100 can be configured to utilize e-mail addresses and/or cellular phone numbers and/or social network accounts, etc. provided to it by tournament creator or by social network 810. In some cases in which the players to be invited to the tournament are registered to system 100, system 100 can retrieve the required data (e.g. cellular phone numbers, email addresses, social network accounts) from data repository 150 and utilize the retrieved data in order to send the invitation notifications to the players to be invited to the tournament. FIG. 6 is flowchart illustrating one example of a sequence of operations carried out for sending notifications to invitees or participants of an a-synchronous multi-player tournament, in accordance with the presently disclosed subject matter. Process 600, which begins as a notification, is generated by system 100 (step 610). Such a notification can include details regarding the created tournament, such as, for example, the tournament creator, the start date, the time interval for a player to make a game move, etc. In some cases, the invitation notifications can also contain a link for accepting the invitation to the tournament. Following creation of the invitation notification (or any other notification), system 100 can be further configured to create platform compatible invitation notifications (or any other notification) (step 620). Reverting to FIG. 9, a block diagram schematically illustrates one example of simultaneous notification distribution to multiple platforms, in accordance with the presently disclosed subject matter. As detailed above, the notification can be directed to a plurality of clients. Clients 101-1 and 101-2 can be for example cellular phones and client 101-3 and 101-*n* can be for example laptop computers. Messaging module 170 can be configured to generate a platform compatible notification to each respective client. Thus, a text message for a cellular phone will be generated according to a cellular phone format for clients 101-1 and 101-2, whereas an e-mail message will be generated according to e-mail messages format for client 101-3 and 101-*n*.

Returning to FIG. 6, after generating the platform compatible invitation notifications (or any other notification) by messaging module 170, system 100 can be configured to send the generated platform compatible notifications to the tournament invitees (step 630).

After sending invitation notifications to the players to be invited to the tournament, system 100 can be further configured to initiate the tournament (step 250). At this stage, a tournament is created and saved in data repository 150 along with all relevant data provided by the tournament creator (e.g. the tournament and game parameters set by the tournament creator, the invited players, etc.).

Following tournament initiation, and, in some cases, depending on fulfillment of certain conditions as further discussed with reference to FIG. 4, the tournament starts and system can be configured to manage the tournament (step 260) as further discussed with reference to FIG. 5.

Figure 3:
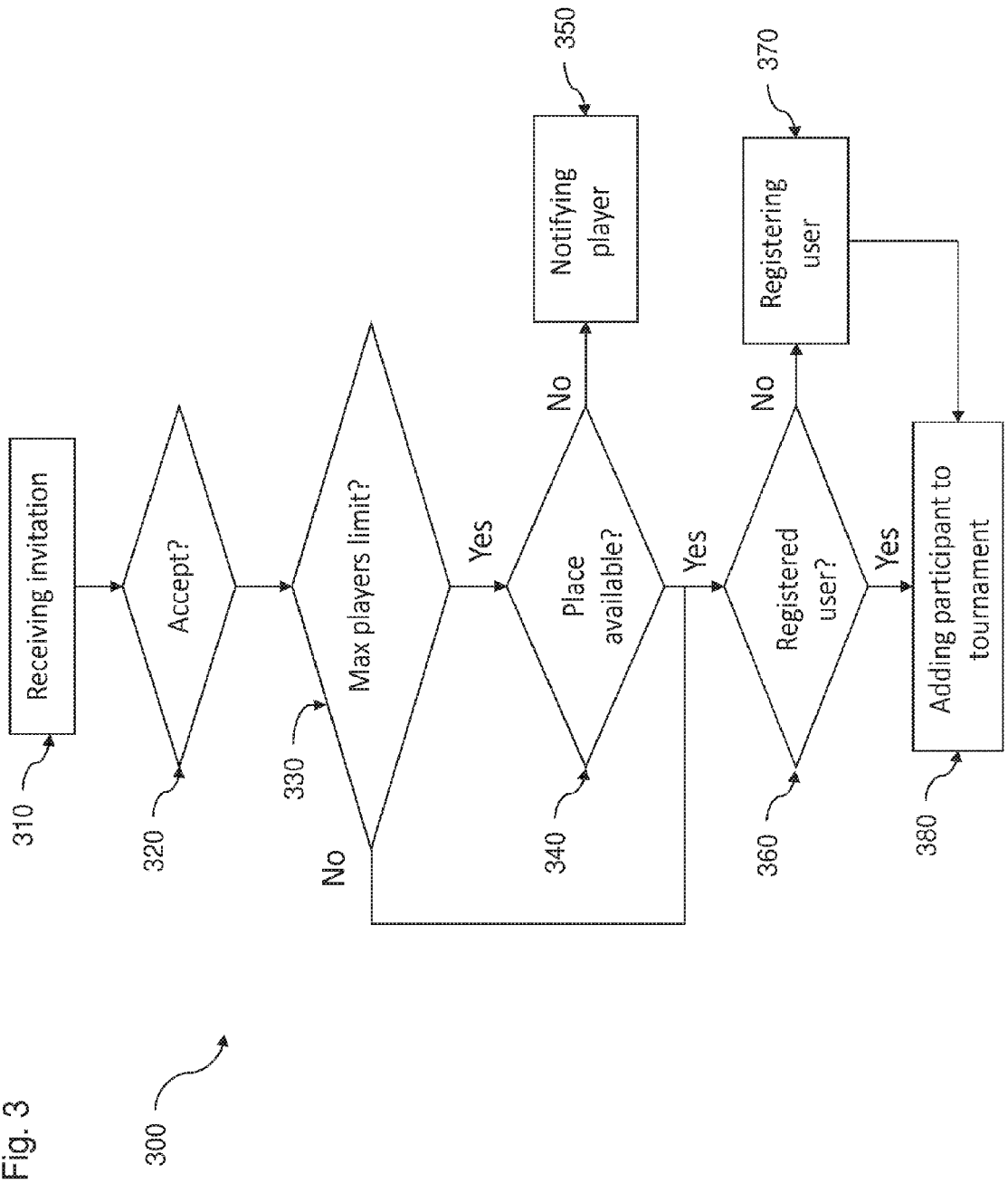
FIG. 3 is a flowchart illustrating one example of a sequence of operations carried out by an invitee for accepting an invitation to an a-synchronous multi-player tournament, in accordance with the presently disclosed subject matter.

Turning to FIG. 3, a flowchart illustration of one example of a sequence of operations carried out by an invitee for accepting an invitation to an a-synchronous multi-player tournament, in accordance with the presently disclosed subject matter, is 10 depicted. At the first step, a player receives an invitation to a tournament (step 310). As described above, the invitation notifications can be sent to a plurality of clients (101-1 to 101-*n*) utilizing a plurality of messaging methods, including, but not limited to, email messages, text messages to cellular phones, messages to social network accounts, etc. As further detailed above, the invitation notification can, in some cases, contain a link for accepting the invitation to the game. Pressing the acceptance link can, for example, cause issuance of a notification to system 100 indicating that the player invited to the tournament has accepted the invitation. In other cases other methods for issuing acceptance notifications to system 100 can be utilized, for instance, opening a web-browser (such as Internet Explorer, Mozilla Firefox, etc.) in which an acceptance button or other acceptance enabling element can be used by the player invited to the tournament to indicate that he is accepting the invitation to the tournament. Another example of a method to accept an invitation can be, for example, replying to the origin of the invitation notification (e.g. replying to the e-mail address from which the e-mail invitation notification originated, replying to the phone number from which the text message invitation notification originated, etc.).

System 100 can be configured to receive notifications from players that accepted the invitation to the tournament (step 320). In case system 100 receives a notification that a player has accepted the invitation to the tournament, system 100 can be configured to check if the tournament creator set a maximum limit of players in the tournament (step 330). If there is a maximum players number in the tournament limit, system 100 can be configured to check if there is still place available in the tournament (if the number of players currently registered to the tournament is lower than the maximum players in the tournament limit) (step 340). If there is no available place in the tournament, system 100 can be configured to notify the player that accepted the invitation that there is no available place in the tournament (step 350). It is to be noted that system 100 can be configured to check for existence of other criteria parameters set by the tournament creator (e.g. minimum score for entering the tournament, etc.) in the same manner.

If there is no maximum limit of players in the tournament, or, there is still an available place(s) in the tournament (and/or, in some cases, other criteria parameter set by the tournament creator is met), system 100 can be configured to check (for example by fetching the relevant data from data repository 150) if the player that accepted the invitation is registered to system 100 (step 360). In case the player is not registered to system 100, system 100 can be configured to register the user (step 370). For this purpose, system 100 can be configured, for example, to redirect the player to a registration web-page, or automatically register the player to system 100. Such automatic registration can be performed, inter alia, by using an identifying data such as the data provided by the tournament creator when inviting the player to the tournament (e.g. player phone number, e-mail address, etc.). If the player is registered to system 100 or after his registration to system 100, system 100 can be configured to add the player to the tournament to which he accepted the invitation (step 380) and update data repository accordingly.

Figure 4:
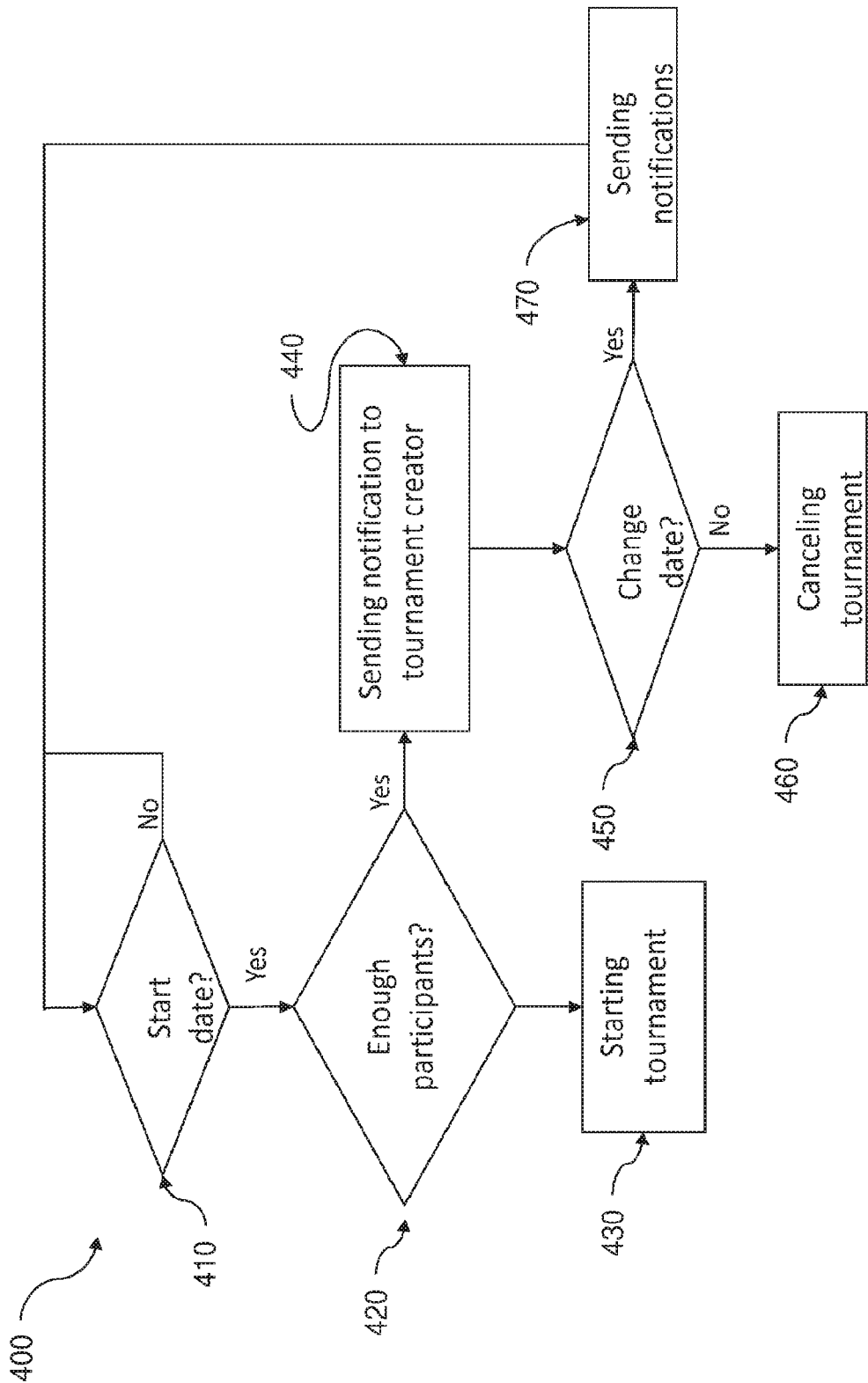
FIG. 4 is a flowchart illustrating one example of a sequence of operations carried out for starting an a-synchronous multi-player tournament, in accordance with the presently disclosed subject matter.

FIG. 4 is a flowchart illustrating one example of a sequence of operations carried out for starting an a-synchronous multi-player tournament, in accordance with the presently disclosed subject matter. System 100 can be configured to check, for example periodically, for each tournament that has not yet started, if the start date of the tournament, set by the tournament creator, has arrived (step 410). If the start data of the tournament did not arrive, system 100 is configured to repeatedly perform the check if the start data has arrived, for example periodically. If the start date of the tournament has arrived, system 100 can be configured to check if enough players accepted the invitation to the tournament (step 420). In some cases a minimum number of players is required in light of specific game rules. For example, for a game of checkers, at least two players are required (as a single game requires two players). In such cases, system 100 can be configured to check that enough players accepted the invitation to enable playing at least one game according to the game rules. In case the tournament creator set a minimum number of participants in tournament, system 100 can be further configured to check that enough players accepted the invitation in order to meet the limitation. In case enough players accepted the invitation, system 100 can be further configured to start the tournament, as further elaborated with respect to FIG. 5. If, however, not enough players accepted the invitation, system 100 can be configured to send a notification to the tournament creator (step 440), indicating that there are not enough participants in the created tournament at the tournament start date. The tournament creator can then instruct system 100 to change the tournament start date (step 450). If the tournament creator is not interested in changing the tournament start date, system 100 can be configured to cancel the tournament (step 460). Such deletion of the tournament can include, inter alia, deleting the corresponding records from data repository 150. In case the tournament creator instructs system 100 to change the start date of the tournament, system 100 can be configured to send notifications indicating the new tournament start date to the players invited to the tournament (step 470).

Figure 5:
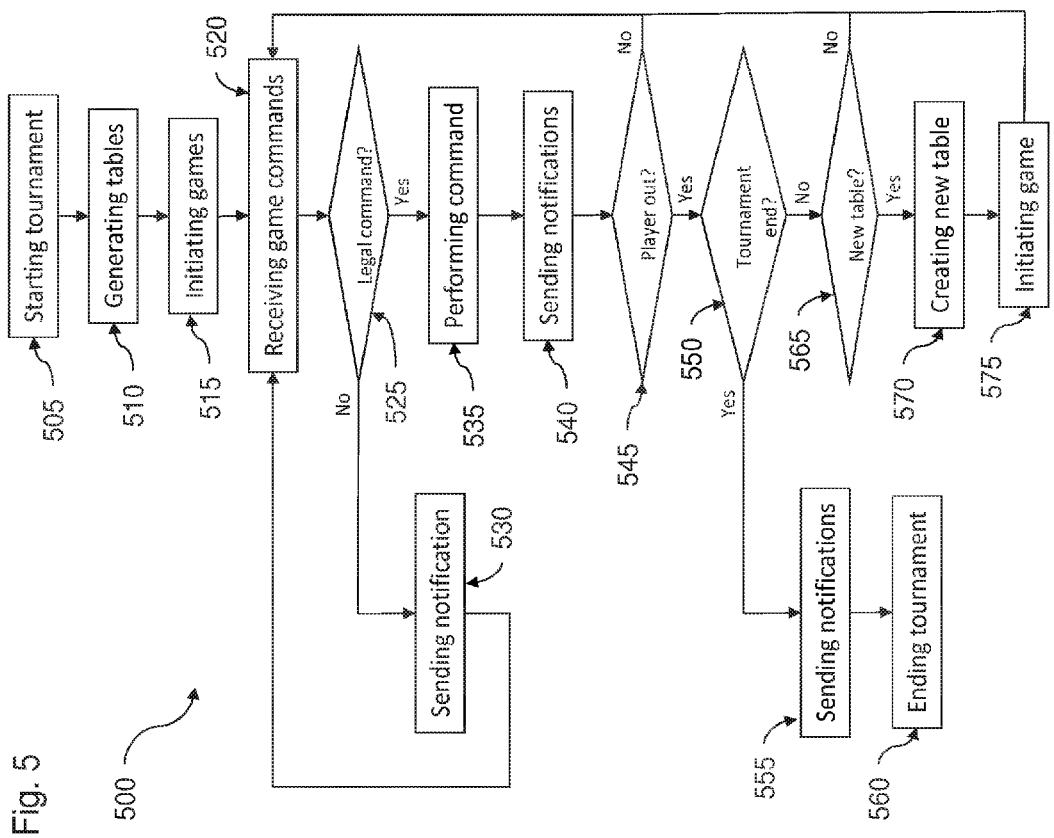
FIG. 5 is a flowchart illustrating one example of a sequence of operations carried out for managing an a-synchronous multi-player tournament, in accordance with the presently disclosed subject matter.

Turning to FIG. 5, a flowchart illustrates one example of a sequence of operations carried out for managing an a-synchronous multi-player tournament, in accordance with the presently disclosed subject matter. Process 500 begins by starting a tournament (step 505). A tournament starts when all conditions (including conditions set by tournament creator, such as tournament start date, etc. and conditions that result from the specific game logic for the tournament, such as minimum number of players, etc.) for starting the tournament, are met.

After the tournament starts, system 100 can be configured to generate game tables (step 510). For this purpose, system 100 can be configured to utilize the tournament and game parameters provided by the tournament creator. As noted above, a tournament is a set of one or more games, wherein each game involves a subset of at least two of the tournament players. As detailed above, the tournament creator can, in some cases, select the type of game to be played in the tournament. Each type of game is associated with a set of game rules stored in data repository 150 and utilized by game logic module 160 as detailed above and further detailed below. Part of the game rules can include a minimum and/or maximum number of players participating in a single game of the tournament. Additionally or alternatively, tournament creator can also decide on a minimum and/or maximum number of players in a single game of the tournament. System 100 can utilize the number of players registered to the tournament and the maximum and/or minimum number of players in a single game limitations imposed by the game rules and/or by the tournament creator for generating one or more logical game tables, in which a single game of the tournament occurs. By way of example, assuming that ten players accepted the invitation to the tournament, and assuming that the game type selected for the tournament is a Tic-Tac-Toe, five game tables will be generated by system 100. This is of course a result of the fact that according to the game rules of the game Tic-Tac-Toe, two players play in a single game. If, however, the game type selected by the tournament creator is Monopoly®, system 100 can generate a single game assuming that there is no limitation on the number of players in a single game in the game of Monopoly®. If however, there is a limitation of, for example, a maximum number of four players in a single game (either due to the game rules or due to the maximum number of players in a game parameter provided by the tournament creator), system 100 can be configured to generate three game tables while assigning four players to the first and second game tables and two players to a third game table—thus all ten players are assigned to a game table. Further assuming that there is an additional limitation of, for example, a minimum number of three players in a single game table (either due to the game rules or due to the minimum number of players in a game parameter provided by the tournament creator), system 100 can be configured to generate for example two game tables while assigning four players to the first and second game tables. In such cases, the remaining two players will wait until at least one player will be removed from one of the two game tables generated by system 100 (for example in case the player lost the game, etc.), thus enabling generation of a third game table with the two players that were not assigned to any of the first and second game tables and the at least one player that was removed from one of the two game tables. It is to be noted that this is a mere example of a process of generating game tables and game tables can be generated by utilizing other methods.

After generation of game tables and assignment of players thereto, system 100 can be configured to initiate the games (step 515). In such an initiation stage, system 100 can be configured, inter alia, to determine what will be the order of participation in each game (the turns, i.e. who will be the player to make the first move in each game table, who will be the player to make the second move in each game table, etc.).

Once the games are initiated, system 100 can be configured to receive game move commands (step 520). Such game move commands originate from clients associated with players participating in a game—in their turn. System 100 can be configured in a way that a player will be able to send a game move command only when it is his turn to make a move in the game table.

When receiving a game move command, system 100 can be configured to check if the game move command is a legal command according to the game logic of the selected game type (step 525). As detailed above, each game type is associated with a game logic thus enabling validation of the received game move commands in view of the specific game rules. In case the received game move command is not a legal commend, system 100 can be configured to send an appropriate notification to the player that initiated the game move command (step 530). Such notification can be sent to a plurality of clients (101-1 to 101-n) associated with the player that initiated the game move command (e.g. a text message for cellular phone and an e-mail address for a personal computer) utilizing a plurality of messaging methods, as detailed above with respect to sending invitation notifications step in FIG. 1. If however, the received game move command is a legal command, system 100 can be configured to perform the received game move command (step 535) and update data repository 150 accordingly. In some cases, performance of a game move command can have an effect, defined by the game rules of the specific game type, on a player score. Such an effect can be a positive effect or a negative effect, as defined by the game rules. For example, in Monopoly®, certain game moves can cause a player to lose his turn, to receive points, to lose points, etc. As in some cases the score represents money, such points addition or deduction can represent in some cases losing or gaining money. Another example is in Poker in which a game move is characterized in some cases, inter alia, by betting a certain amount of score (representing money in system 100). Betting a score (representing money in system 100) results in reducing the amount of score (representing money in system 100) of the betting player. When a player wins a game—all scores betted by any of the players of the game table is added to his score (representing money in system 100). It is to be noted that other game types can have other scoring methods and each scoring method can be managed by game logic module 160, independently of any other module of system 100.

Once the game move command is performed, and the respective updates are made to data repository 150, system 100 can be configured to send appropriate notifications to all players participating in the game in which the game move has been made (step 540). Such notifications can also be sent to a plurality of clients (101-1 to 101-*n*) associated with the players participating in the game in which the game move has been made, utilizing a plurality of messaging methods as detailed above.

System 100 can be further configured to check if a specific game move performed by a player caused a player to be removed from a game table (step 545). A player can be removed from a game table, for example, if, according to the game rules, he lost the game or, another non-limiting example is choosing to quit a game (for example in Poker, a player can choose to fold out of a game). If no player is removed from a game table, the system 100 can be configured to continue receiving game move commands and repeat the process detailed above for each received game move command. However, if a player is removed from a game table pursuant to performance of the game move command, system 100 can be configured to check if the tournament has ended (step 550). A tournament can come to an end, for example, when there remains only one player that did not lose a game, or when all players lost all of their scores (as detailed above, the score can represent money in some cases, thus losing all of the score representing the money can be regarded as losing the tournament). Another option is that a certain player reached a pre-defined number of game winnings. It is to be noted that a tournament can come to an end in other ways and all examples provided above are non-limiting.

If the tournament has ended, system 100 can be configured to send notifications to all of the players that participated in the tournament (step 555). Such notifications can also be sent to a plurality of clients (101-1 to 101-*n*) associated with the players that participated in the tournament, utilizing a plurality of messaging methods as detailed above. Following sending of the notifications, system 100 can be configured to end the tournament (step 560).

In some cases, in case the tournament did not end in light of the player removal from the game table, system 100 can be configured to update data repository 150 to indicate that the player removed from the game table is not part of any game table in the tournament. System 100 can be further configured to check if the number of players that are not assigned to any game table is equal to the minimum number of players for a single game of the tournament as defined by the game rules and/or by the tournament creator as detailed above (hereinafter: "minimum players for new table"). If the number of players that are not assigned to any game table is lower than the minimum players for new table, system 100 can be configured to continue receiving game move commands. If, however, the number of players that are not assigned to any game table is equal to the minimum players for new table, system 100 can be configured to create a new table (step 570) and assign the players that are not assigned to any game table to the new table. Following creation of a new table, the system 100 initiates the game in the new table (step 575). In such an initiation stage, system 100 can be configured, inter alia, to determine what will be the order of participation in each game (as detailed above with respect to step 515).

It is to be noted that in some cases, (for example, according to certain game rules) according to certain game logic conditions, a player is removed from the tournament and not assigned to a new game table. Such game logic conditions can be, for example, losing two consecutive games, reaching a zero score (for example, in Poker, when a user bets all of his score (representing money) in a game and loses the game), etc.

In some cases, when a player is removed from the tournament, he can re-join the tournament. Such cases can be, for example, when a player purchases additional score (representing money) in the tournament.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

What is claimed is:

1. An online social networking system, comprising:
   means for receiving a request from a tournament creator to initiate a tournament;
   means for authenticating that the tournament creator is on the social networking system by providing identification parameters of the tournament creator to the social networking system;
   means for retrieving from the social networking system, a list of friends of the tournament creator;
   means for receiving a set of tournament parameters from the tournament creator, wherein the tournament parameters include a selection of tournament participants from the list of friends of the tournament creator on the social networking system;
   means for concurrently sending invitations to join the tournament to a plurality of client devices associated with the selected tournament participants utilizing a plurality of different communication platforms for the client devices, by generating for each selected participant, a communication platform compatible message for the client device of the selected participant, wherein the platform compatible messages include e-mail messages, cellular-based text messages, and social networking system messages;
   means for receiving notifications from the invited participants that accepted the invitations; and
   means for initiating a tournament on the social networking system including the participants that accepted the sent invitations according to the received set of tournament parameters.

2. A system for a-synchronous multi-player network-based and turn-based gaming, the system comprising a gaming server that communicates with a plurality of user communication accounts, the gaming server having a processing unit configured to:
   receive, by the gaming server over a network, tournament parameters from at least one communication account associated with a tournament creator, the tournament parameters including:
      a list of two or more selected players wherein the two or more selected players are selected by the tournament creator, and wherein each of the two or more selected players are associated with a respective communication account; and
      a time interval defining a duration of each player's turn;
   send, by the gaming server over a network, tournament invitations to the communication accounts associated with the selected players;
   receive, by the gaming server, participation authorization from the communication accounts associated with at least two of the selected players;
   start, by the gaming server, a tournament comprised of one or more games wherein each game includes two or more of those selected players from whom the participation authorization was received, and for each game:
   initiate, by the gaming server, a turn for a first player of the included players, wherein a duration of the turn is equal to the time interval; and
   responsive to receiving no response from the client device associated with the first player during the turn, perform, by the gaming server a penalizing action associated with the first player.

3. The system of claim 2 wherein the gaming server further includes a game logic module comprising at least one set of game rules, each defined by a game logic, and wherein the gaming server is further configured to instruct the processing unit to manage the games according to one of the at least one game logic.

4. The system of claim 2 wherein the gaming server is further configured by programming code to instruct the processing unit to dynamically allocate the selected players to games.

5. The system of claim 4 wherein the tournament parameters further include a parameter of a minimum number of players for a single game, and wherein the gaming server is further configured to instruct the processing unit to generate a game when a number of players not included in a game is equal to or larger than the parameter of a minimum number of players for a single game.

6. The system of claim 2 wherein the tournament parameters further include a parameter of a minimum number of players in the tournament and wherein the gaming server is configured to instruct the processing unit to start the tournament only if the participation authorization was received from more than the minimum number of players in the tournament.

7. The system of claim 2 wherein the tournament parameters further include a time window in which the tournament is not active and wherein the time interval is paused for a duration of the time window.

8. The system of claim 2 wherein only players invited to the tournament can join the tournament.

9. The system of claim 2 wherein players that were not invited to the tournament can join the tournament.

10. The system of claim 2 wherein the gaming server is further configured to instruct the processing unit to generate a tournament invitation in a format associated with the communication account associated with an intended recipient of the tournament invitation.

11. The system of claim 2 wherein the list of selected players is generated by the tournament creator by utilizing the tournament creator's list of friends from a social network or a combination of the list of friends from a social network and a list of friends generated by the tournament creator.

12. The system of claim 11 wherein utilizing the tournament creator's list of friends from a social network further includes instructing the processing unit to retrieve the list of friends from the social network, store the list of friends on a data repository and cause the display of the list of friends via one communication account associated with the involved players.

13. The system of claim 11 wherein the gaming server is further configured to receive a filtering criterion and instruct the processing unit to filter, according to the filtering criterion, at least one of the list of friends from a social network and the list of friends generated by the tournament creator.

14. The system of claim 13 wherein the filtering criterion is at least one of the following:
   a minimum player score;
   a maximum player score;
   a minimum number of tournaments participated by the player; and
   a maximum number of tournaments participated by the player.

15. A method for a-synchronous multi-player network-based and turn-based gaming, the method comprising instructing a processing unit of a gaming server to perform the following:
   receiving, by the gaming server over a network, tournament parameters from at least one communication account associated with a tournament creator, the tournament parameters including:
      a list of two or more selected players wherein the two or more selected players are selected by the tournament creator, and wherein each of the two or more selected players are associated with a respective communication account; and
      a time interval defining a duration of each player's turn;
   sending, by the gaming server over a network, tournament invitations to the communication accounts associated with the selected players;
   receiving, by the gaming server, participation authorization from the communication accounts associated with at least two of the selected players;
   starting, by the gaming server, a tournament comprised of one or more games wherein each game includes two or more of those selected players from whom the participation authorization was received, and for each game:
   initiating, by the gaming server, a turn for a first player of the included players, wherein a duration of the turn is equal to the time interval.

16. The method of claim 15 wherein the gaming server further includes a game logic module comprising at least one set of game rules, each defined by a game logic, and wherein the gaming server is further configured to instruct the processing unit to manage the games according to one of the at least one game logic.

17. The method of claim 15 wherein the gaming server is further configured by programming code to instruct the processing unit to dynamically allocate the selected players to games.

18. The method of claim 17 wherein the tournament parameters further include a parameter of a minimum number of players for a single game, and wherein the gaming server is further configured to instruct the processing unit to generate a game when a number of players not included in a game is equal to or larger than the parameter of a minimum number of players for a single game.

19. The method of claim 15 wherein the tournament parameters further include a parameter of a minimum number of players in the tournament and wherein the gaming server is configured to instruct the processing unit to start the tournament only if the participation authorization was received from more than the minimum number of players in the tournament.

20. The method of claim 15 wherein the tournament parameters further include a time window in which the tournament is not active and wherein the time interval is paused for a duration of the time window.

* * * * *